Dec. 28, 1954  C. F. DINLEY, JR  2,698,288
COMBINED ARTICLE TREATING AND LIQUID DISTILLING APPARATUS
Filed March 25, 1952  2 Sheets-Sheet 1
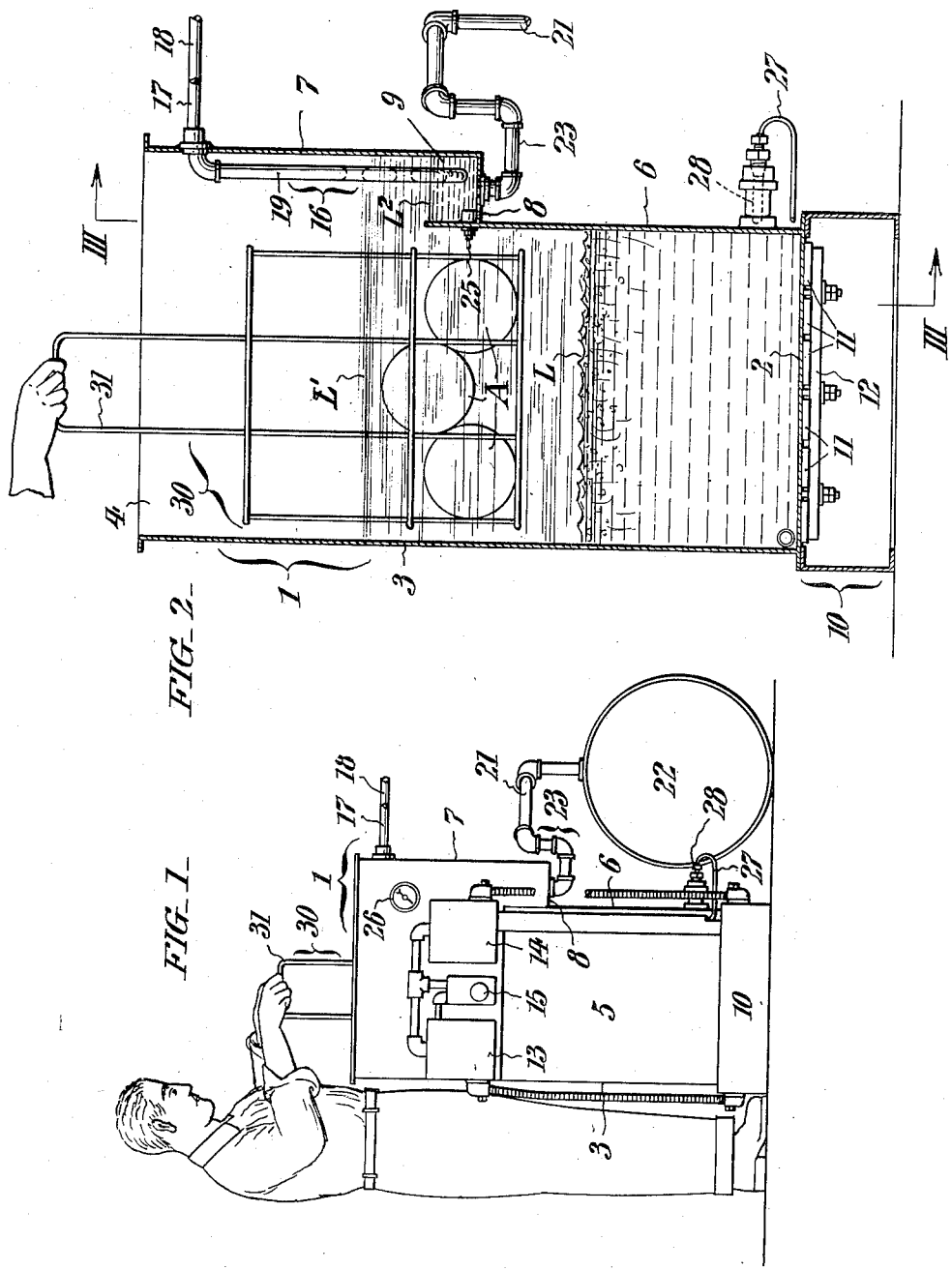
INVENTOR:
*Clarence F. Dinley, Jr.,*
BY *Paul & Paul*
ATTORNEYS.

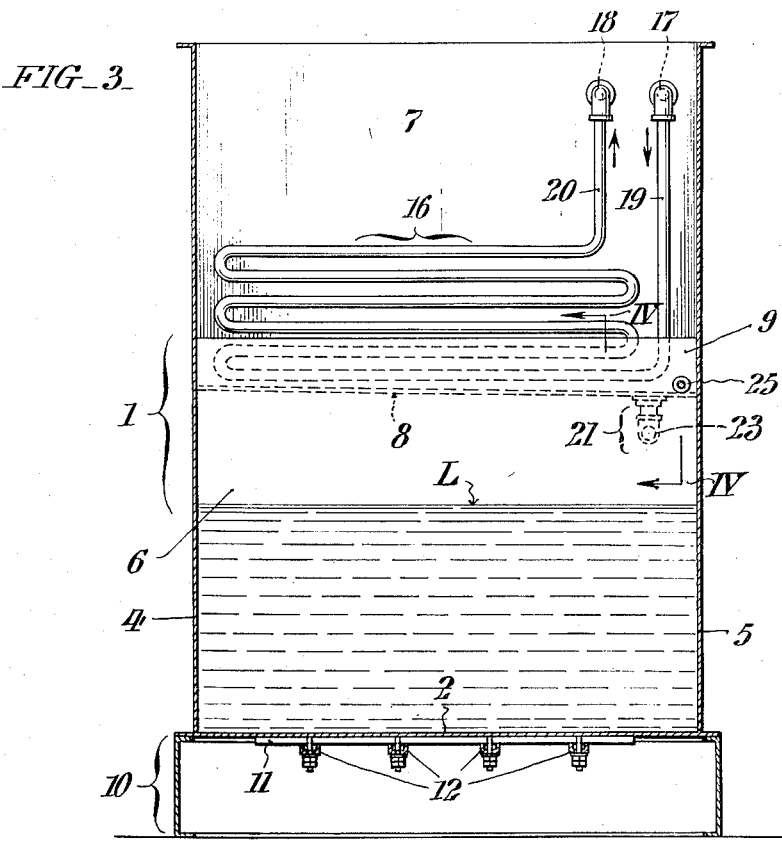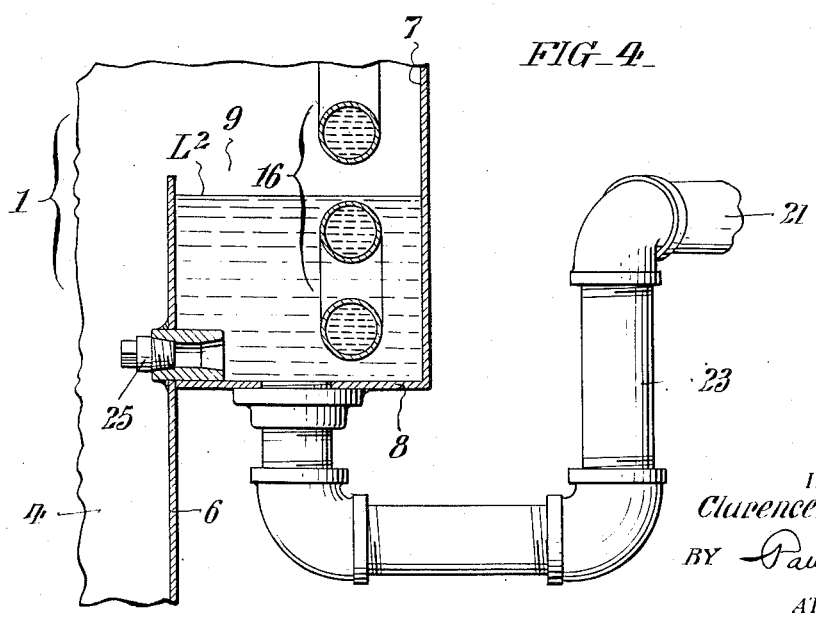

United States Patent Office 2,698,288
Patented Dec. 28, 1954

2,698,288

COMBINED ARTICLE TREATING AND LIQUID DISTILLING APPARATUS

Clarence F. Dinley, Jr., Detroit, Mich., assignor to Detrex Corporation, Detroit, Mich., a corporation of Michigan Application March 25, 1952, Serial No. 278,467

1 Claim. (Cl. 202—170)

This invention relates to an article treating and liquid distilling apparatus wherein surface material is removed from articles by contacting the articles with a volatile liquid or the vapors thereof, and more particularly concerns an apparatus for removing silicone resin glaze from the surfaces of utensils such as baking pans and the like. The invention also concerns an apparatus of this character including a tank wherein soils such as oils, greases, dirt, plastics and the like may be removed from the surfaces of articles of various types by contacting the articles with a volatile liquid or its vapor, and wherein the contaminated or depleted volatile liquid thus created may readily be purified by distillation, and reused.

In conventional apparatus of the kind referred to, a volatile liquid is heated to the boiling point or to a temperature below the boiling point, and articles are treated by immersing them in the liquid or by placing them in the vapors located above the liquid. Soil which is thus removed from the articles collects in the receptacle and contaminates the volatile liquid, which is periodically purified by distillation. However, this distillation step has heretofore required rather expensive condensing and aftercooling apparatus as well as a separate storage tank for the volatile liquid. Article treating machines of this type have not been particularly effective for cleaning or treating limited numbers of pans as well as bakery and other articles and equipment, since machines for these purposes must be relatively compact and inexpensive and the expense of complicated condensing and aftercooling apparatus is frequently not warranted. It has not heretofore been practicable to eliminate condensers or aftercoolers from conventional article-treating and distilling machines since this has resulted in excessive vapor losses.

It is accordingly one object of this invention to provide a combined article treating and liquid distilling apparatus which is simple, compact, and inexpensive. Another object is to provide an apparatus of this kind wherein the vapor losses of volatile liquid are minimized. Still another object is to provide such an apparatus which has built-in storage capacity for the volatile liquid condensate. Other objects and advantages of the invention will further become apparent hereinafter, and in the drawings, whereof:

Fig. 1 is a view in side elevation of a combined treating apparatus and still conveniently embodying my invention;

Fig. 2 is an enlarged view similar to Fig. 1, the apparatus being shown in longitudinal section;

Fig. 3 is a transverse sectional view taken as indicated by the lines and arrows III—III which appear in Fig. 2; and Fig. 4 is an enlarged fragmentary view in section showing one portion of the apparatus represented in Fig. 2.

Referring now to the specific form of the invention selected for illustration in the drawings, the apparatus comprises a tank 1 which may be of metal, and which is rectangular in plan, having a flat bottom 2 and straight full height front and side walls 3, 4 and 5 respectively. The back wall of the tank includes a lower section 6 which extends up about half way of the height of the tank and a rearwardly-offset upper section 7, the latter section extending down to a level below the top edge of the lower section 6, and the two being connected by a horizontal section 8 with consequent formation of a trough 9. The upper section 7 of the back wall and the trough bottom 8 are each directly exposed to the atmosphere, as best shown in Figs. 2 and 4. Connected to the bottom of trough 9 through a trap 23 is a drainage conduit in the form of a pipe line 21 which leads, see Fig. 1, to a receiving drum 22 supported on the floor or elsewhere at the back of the tank.

Near the top of the rear wall 6, just above the bottom 8 of trough 9, an opening is provided which connects the trough 9 to the tank 1. Closure means in the form of a removable screw plug 25 (see Figs. 2–4) is provided for closing said opening.

The tank 1 is normally kept charged with volatile liquid to a level L well below the top of the lower section 6 of the back wall. During use of the apparatus, the volatile liquid is maintained at the proper operating temperature or at the boiling point by an electric heating means shown in Figs. 2 and 3, such heating means being disposed in the hollow base 10 of the apparatus. The heating means includes a plurality of resistance bar elements 11 arranged in spaced parallel relation and supported in direct contact with the bottom of the tank 1 by transverse bolt-secured straps 12. The resistance bar elements 11 are heated through electric circuits including separate manual switches which are housed in boxes 13 and 14 respectively (Fig. 1). A thermostat 15 maintains the treating liquid at any pre-selected temperature. A gas or steam type of heating means may, of course, be substituted for the electric type herein shown by way of example.

The temperature of the liquid in the tank 1 is recorded by a gauge 26 (Fig. 1) which is connected by a tube 27 (Fig. 2) to a thermometer bulb 28 set into the rear wall of said tank. A basket 30 (Figs. 1 and 2) with grasp handles 31 is provided for suspending the articles A within the vapor zone in the upper part of the tank, or in the liquid in the lower part of the tank.

Arranged within the tank adjacent the upper section 7 of the rear wall is a set of flat coils 16 with horizontally-extending convolutions through which a suitable coolant such as water or the like is continuously or occasionally passed. The coolant is conducted to and discharged from coil 16 via pipes 17 and 18, respectively. Pipes 17, 18 enter the tank 1 through the upper section 7, and are connected to the vertically extending terminals 19 and 20 of the set of coils 16. It is to be particularly noted that the lower portion of the set of coils 16 extends into the trough 9.

Operation

For normal use of the apparatus, the plug 25 is removed from the opening at the bottom of trough 9. When the volatile liquid in the tank 1 is heated to boiling, vapors rise in the tank 1 to the level L′ and are condensed on the condensing coils 16. The condensate is collected in the trough 9 and refluxed to the tank 1 through the opening provided by removing plug 25. Since the trough 9 is open at or near its bottom the condensate level is well below the bottom of the set of coils 16 and the entire coil area serves as a condensing coil. Treatment of the articles A is effected by suspending the basket 30 for a time in the vapor zone or in the liquid in tank 1.

When the volatile liquid becomes contaminated or depleted and the tank 1 is to be cleaned of dirt or sediment, the volatile liquid (or the volatile component of the liquid) may be recovered in the same apparatus by distillation. The plug 25 is inserted in its opening and the liquid in tank 1 is boiled. Vapor rises substantially to the level L′ and is condensed on the upper portion of the set of coils 16. The condensate is collected in the trough 9 and rises to the level $L^2$ and is accordingly stored in the trough 9. Any excess condensate flows through the trap 23 and pipe 21 to the drum 22 or other receiver for storage. Since the lower portion of the set of coils 16 extends below the level $L^2$, said lower portion is submerged in the condensate in trough 9 and serves as a condensate aftercooler. It will be observed that, for maximum aftercooling, the cold water or other cooling medium is introduced directly to the aftercooler coils through the pipe 17 whereupon the cooling medium is at its lowest temperature in the aftercooler coils, and at a slightly higher temperature in the condenser coils.

Since the side walls 7 and bottom 8 of trough 9 are directly exposed to the atmosphere, the condensate is cooled to a certain extent by the surrounding air. Moreover the bottom 8 is shielded from boiling volatile liquid in tank 1 by the wall 6 and the condensate in trough 9 is not heated directly by the hot vapors in tank 1. Consequently loss of condensate by evaporation is held to a minimum during the transfer from trough 9 to receiver 22. The distillation is continued until all of the liquid is boiled off from the tank, whereupon the accumulated sediment may be removed in any convenient way. After cleaning, the apparatus is re-prepared for normal use by removing the plug 25, placing fresh volatile liquid (which may include the recovered condensate) into the tank, and turning on the electric current to the resistance bars 11.

Although the invention has been described in detail with reference to one selected embodiment thereof, it may also be practiced by substituting a wide variety of modifications or equivalents for the elements shown and described herein. All such modifications, including reversals and equivalent rearrangement of parts and the use of certain features independently of the use of other features, are within the spirit and scope of the invention as defined in the appended claim.

Having thus described my invention, I claim:

Apparatus for treating articles with a volatile solvent comprising a receptacle having a bottom and upstanding walls forming a lower portion containing the solvent, means in said lower portion for vaporizing the solvent, said receptacle including an upper portion containing solvent vapor, said upper portion including an overhanging section in which is located a substantially vertically arranged condenser, a trough having substantial depth located at the bottom of said overhanging section directly below said condenser to collect the condensed solvent, said trough having an open top, said condenser including a heat exchange portion extending from a level above the top of the trough to a level adjacent the bottom of said trough and extending into the trough, means for circulating coolant through said condenser, said trough having an opening adjacent its bottom communicating with said vaporizing section through which condensed vapors may be returned to said vaporizing section, means for closing said opening, and continuously operative means connected to the lower level of said trough for forming a predetermined condensate level in said trough above the bottom of said condenser when said opening is closed, thereby submerging a portion of said condenser, said continuously operative means also maintaining said predetermined condensate level substantially constant independently of the rate of solvent vaporization, said submerged portion of the condenser serving to cool the vapors.

References Cited in the file of this patent

UNITED STATES PATENTS

| Number | Name | Date |
|---|---|---|
| 1,437,743 | Arii | Dec. 5, 1922 |
| 1,938,841 | Koch | Dec. 12, 1933 |
| 1,973,426 | Booth et al. | Sept. 11, 1934 |
| 2,116,862 | Dinley | May 10, 1938 |